United States Patent Office 3,639,345
Patented Feb. 1, 1972

3,639,345
SHELF-STABLE EPOXY RESIN COMPOSITION OF EPOXY RESIN AND ADDUCT OF TRIMELLITIC ANHYDRIDE AND POLYALKYLENE GLYCOL
Charles A. Whittemore, Denver, Colo., and Robert E. Spangler, White Bear Lake, Minn., assignors to Minnesota Mining and Manufacturing Company, St. Paul, Minn.
No Drawing. Filed Nov. 28, 1969, Ser. No. 880,910
Int. Cl. C08g 30/121
U.S. Cl. 260—47 EA
4 Claims

ABSTRACT OF THE DISCLOSURE

Shelf-stable epoxy resin composition that can be pulverized to a dry powder for fluidized bed or dry spray coating of heated objects to provide tough flexible protective coatings. The composition comprises a high-melting diglycidyl ether of a dihydric phenol and an adduct of one mol of trimellitic anhydride per hydroxyl equivalent of a polyalkylene glycol, especially polyethylene glycol.

FIELD OF THE INVENTION

This invention relates to epoxy resin compositions that in powder form are useful in fluidized bed and dry-spraying procedures for applying resinous coatings to heated objects.

BACKGROUND OF THE INVENTION

The thermosetting epoxy resin powders are widely use in procedures wherein the powder impinges and fuses on a heated object and then is cured to provide a protective coating. For example, Winthrop-Skotnicki U.S. Pat. No. 3,102,043 and Wear U.S. Pat. No. 2,847,395 discloses thermosetting epoxy resin powders which can be stored for many months at room temperature, but which fuse upon contacting a heated object and cure rapidly upon continued moderate heating to provide a well bonded, durable coating. However, the cured coatings of working examples of that patent are rather rigid and thus tend to crack upon severe bending or flexing, as when a coated pipe is bent 90 degrees.

Heretofore other have endeavored to provide epoxy resin compositions which would afford cured coatings of improved flexibility. Lee U.S. Pat. No. 3,269,975 discloses a mixture of particles of epoxy resin and a hardener which is an adduct of trimellitic anhydride and a dihydric alcohol such as tetraethylene glycol. Lee's mixture does provide better flexibility, but with a number of attendant disadvantages. First, the two types of particles may not have the same specific gravity in which case the composition of a fluidized bed of the mixed particles tends to be nonuniform. Also, the two types of particles may not have equal sticking temperature so that a greater percentage of one might fuse to a heated object. It would be very difficult to adjust both the specific gravities and the sticking temperatures to equality. In addition, there is a danger of nonhomogeneous mixing when the particles fuse on a heated object, which danger is particularly acute when a catalyst is required for fast cure.

Manasia U.S. Pat. No. 3,336,251 discloses epoxy resin compositions similar to those of the Lee patent except that Manasia mixes the epoxy resin and hardener and then pulverizes the mixture. However, cured coatings of powders of the Manasia examples are believed to be somewhat less flexible than are those of some of the Lee examples.

Loncrini U.S. Pat. No. 3,182,073 discloses adducts similar to those of Lee and Manasia and states at the conclusion of the specification that use of these adducts as curing agents for epoxy resin is set forth in U.S. application Ser. No. 233,860, filed Oct. 29, 1962. However, none of the Loncrini patent examples would provide cured epoxy resin products of the flexibility afforded in the practice of the present invention.

Other U.S. patents showing resins chemically similar to those disclosed in the aforementioned patents are Childs 3,269,974, Hirsch-Van Strien 3,183,248 and Lee 3,384,610.

SUMMARY OF THE INVENTION

The epoxy resin composition of the present invention can be pulverized at room temperature to provide a homogeneous dry powder which can be stored at room temperature for many months and then used to provide cured coatings of extra-ordinarily good flexibility. This is achieved by employing as the hardener an adduct of trimellitic anhydride and a polyalkylene glycol having more than 15 carbon and oxygen atoms in the skeletal chain between the hydroxyl groups. Particularly preferred as the polyalkylene glycol are polyethylene and polypropylene glycols having more than 15, and up to about 30 or 40, carbon and oxygen atoms in the skeletal chain between the hydroxyls. In all cases, one mol of the trimellitic anhydride should be used per hydroxyl equivalent of the polyalkylene glycol. Other anhydrides have been used in place of part or all of the trimellitic anhydride such as pyromellitic anhydride and 3,3',4,4'-benzophenonetetracarboxylic dianhydride to provide adducts which should afford cured protective coatings of good flexibility.

For fluidized bed and dry spraying uses, it is desirable that the composition be a powder that will pass through a 100-mesh screen. In other words, the particles should be no greater than about 150 microns in diameter. To this end, high melting diglycidyl ethers of diphenols, such as bisphenol A, are particularly useful such as the diglycidyl ether of bisphenol A having a Durrans' melting point of 95°–105° C. and an average epoxide equivalent of 875–1025 ("Epon" 1004). Another especially useful diglycidyl ether of bisphenol A has a Durrans' melting point of 75°–85° C. and an average epoxide equivalent of 500–700 ("Epon" 1002). These specific high melting epoxy resins have a little less than two 1,2-epoxy groups pre average molecular weight but for practical purposes may be considered to be diglycidyl ethers. Preferably the Durrans' melting point of the epoxy resin should exceed 70° C.

Cured products of good quality and excellent flexibility have been prepared in the practice of this invention using the trimellitic anhydride adduct in amounts providing about ⅔ to 1½ carboxyl equivalent per epoxide equivalent of the epoxy resin. For optimum cured properties, approximately stoichiometric amounts are preferred. While these compositions by themselves cure rapidly, gelling within about 2 minutes at 205° C., or in lesser time at higher temperatures, the rate of cure may be greatly speeded by incorporating a catalyst which accelerates the rate of reaction between carboxyl groups and epoxy groups. Some such catalysts speed the rate of cure so that the composition gels and is substantially cured within 20 seconds at 205° C. This is highly desirable for continuous pipe coating operations, since it is often necessary to handle the pipe by its coated surface about 20 seconds after it is coated.

In spite of this capability of curing rapidly upon moderate heating, catalyzed compositions of the present invention have been stored in powder form at ordinary room temperature for six months as of the date of filing this application and are virtually unchanged. These stored powders will fuse and adhere to heated objects, gel at 205° C. in about 45 seconds or less and cure with continued heating to provide tough, flexible, chemically resistant protective coatings.

The compositions of the present invention in powder form will provide uniform coatings on objects preheated to about 150° C., but it is preferable to employ a temperature of 200° C. or above in order to obtain the fast rate of cure desired for must uses.

In general, when the epoxy resin powders of the present invention are used to coat pipe to a typical thickness of 8–12 mils (.2–.3 mm.), the coated pipe can be bent to a radius of ten times its diameter without any cracks developing in the coating.

The epoxy resin powders of the invention preferably contain a wetting or leveling agent to provide uniform coatings. The wetting agent in the examples was "Modaflow," a polymerized ethyl acrylate-long chain hydrocarbon.

Adduct of trimellitic anhydride and polyethylene glycol 300 (Adduct No. 1)

Seventy pounds (31.7 kg.) trimellitic anhydride (M.W. 192) and 54.2 pounds (24.6 kg.) of polyethylene glycol of 300 average molecular weight were charged into a 20-gallon reaction vessel, and this was heated to reflux (185° C.). Heating at reflux was continued for about two hours, followed by cooling to 150° C. over a period of 30 minutes and then draining into trays covered with silicone release paper. The product adduct had an acid equivalent weight of 169.

Adduct of trimellitic anhydride and polyethyene glycol 400 (Adduct No. 2)

307.2 grams of trimellitic anhydride and 316.8 grams of polyethylene glycol of 400 average molecular weight were weighed in a round bottom flask equipped with a paddle stirrer, heating mantle and Vigreaux column. The reaction mixture was heated for one hour at 210° C., allowed to cool and then heated to 90° C., at which point it was still fluid. The reaction mixture was again raised to 210° C. and allowed to cool slowly to 170° C. and poured into aluminum pans. The product adduct was a sticky brittle solid.

In the following examples, all numerical data for cured products are averages of three test values.

EXAMPLE 1

67.4 pounds (30.5 kg.) of a high-melting diglycidyl ether of bisphenol A ("Epon" 1004) was charged to a 60-inch (150-cm.) two-roll rubber mill with a nip setting of 0.2 inch (0.5 cm.). One roll was maintained at about 50° C. and the other at about 5° C. After the resin had banded on the heated roll, 0.3 pound (140 g.) of a wetting agent was added, followed by 1.2 pounds (550 g.) of a pigment mixture of titanium dioxide and chromium oxide, with continued milling until a uniform color was obtained. At this point, 0.6 pound (270 g.) of tris-2,4,6-dimethylaminomethyl phenol catalyst was added across the cooled roll, immediately followed at the nip with 12.1 pounds (5.5 kg.) of Adduct No. 1 (providing one carboxyl equivalent per epoxy equivalent of the diglycidyl ether). After continued milling until homogeneous, the composition was removed from the mill as a thin sheet and allowed to cool. The sheet was ground to a fine powder which would pass 100-mesh screen, after which 1.5% by weight of colloidal fumed silica was dry-blended with the powder.

Gel time of the dry-blended powder at 205° C. was 19 seconds. Gel time is determined by placing about one gram of the powder on a metal plate which has been preheated to 205° C. The powder melts and is then stirred with the probe until it is no longer fluid. The time elapsed between melting and the point at which it is no longer fluid is the gel time.

Metal panels were coated with release agent, preheated to about 218° C., and the dry-blended powder of this example was dry sprayed over the release coating to various predetermined thicknesses, after which the coated panels were suspended in an air-circulating oven for 5 minutes at 218° C. Three strips of the cured sheet material were cut and removed, each about 3" x 0.25" x 0.010" (7.5 x 0.6 x 0.25 cm.). The strips were placed in a tensile tester at an initial jaw separation of one inch (2.5 cm.) and a jaw separation rate of one inch per minute (2.5 cm./min.). Average tensile strength was 7400 p.s.i. (520 kg./cm.$^2$) and break elongation was 10%.

Three specimens of the cured sheet material measuring 3" x 5" (7.5 x 12.5 cm.) having thicknesses of 16–18 mils (0.4–0.45 mm.) were tested for electric strength in an oil bath at 500 volts per second rate of rise at 23° C. The average electric strength was 1060 volts per mil. This value is typical of cured products of the present invention, and indicates their utility for electrical insulating purposes.

Strips of the cured sheet material of about 10-mil (0.25 mm.) thickness were bent flat upon themselves at ordinary room temperature. No cracking could be observed at the bend. By passing this severe "180° Band Test" without cracking, the unsupported cured sheet material of this example demonstrates the superior toughness and flexibility by which the cured products of the present invention are characterized.

A copper bus bar measuring 12" x 1.5" x 0.125" (30 x 3.8 x 0.32 cm.) was wire brushed and coated with the dry-blended powder of this example as follows: At room temperature, powder was applied by electrostatic deposition to the bus bar which then was suspended in an air-circulating oven at 218° C., thus fusing the powder to provide a coating about 2–3 mils (0.05–0.075 mm.) in thickness. When the temperature of the thinly coated bar reached 218° C., the bar was dipped into a fluidized bed of the same powder and returned to the oven for 10 minutes to provide a cured coating of about 20-mil (0.5 mm.) overall thickness.

After the coated bar had cooled to ordinary room temperature, it was bent 90 degrees around a ¼-inch (0.6-cm.) mandrel without any cracking of the cured coating. When another portion of the bar was bent 90 degrees around a ⅛-inch (0.3-cm.) mandrel, the coating cracked. This test demonstrates that the cured coating had excellent flexibility and also that it was well bonded to the copper.

Cured sheet material (2" x 1" x 0.020" or 5 x 2.5 x 0.05 cm.) made from powder of this example, except for omission of the silica, was suspended in an air-circulating oven at 150° C. for 24 hours, 168 hours and 1000 hours. Weight losses were 0.83%, 1.55% and 4.27%, respectively. These are satisfactorily low for thin flexible film.

Other specimens of the same cured sheet material of the same dimensions were immersed in water at ordinary room temperature for 24 hours, 168 hours and 1000 hours. Weight gain was 0.85%, 2.0% and 2.59%, respectively. These are satisfactory low for thin flexible film.

EXAMPLE 2

| | Grams |
|---|---|
| Diglycidyl ether ("Epon" 1004) | 635 |
| Adduct No. 2 | 131 |
| Stannous octoate catalyst | 8 |
| Wetting agent | 3 |

This composition was prepared in the same manner as in Example 1, except on a laboratory basis using a 16-inch (40-cm.) rubber mill and omitting the pigment and silica, to provide an epoxy resin powder of the present invention. The powder was tested as in Example 1, with results as follows:

Gel time at 205° C.—41 seconds
Tensile strength—6500 p.s.i. (450 kg./cm.$^2$)
Elongation at break—16%
180° Bend Test (10 mils thickness)—did not crack

EXAMPLE 3

Four compositions were prepared in the same manner as in Example 1 except on a laboratory basis using a 6-inch (15-cm.) rubber mill, and the pigment and silica were omitted. As another change as compared to Example 1, catalyst was added to the banded diglycidyl ether at the nip, and after a homogeneous blend was obtained, an epoxy diluent was added across the cool roll, immediately followed at the nip by Adduct No. 1. The epoxy diluent was a high boiling aromatic hydrocarbon having alkyl side chains ("Mobilsol" 44). The four compositions and test results obtained as in Example 1 were as follows:

|  | Composition (in grams) | | | |
|---|---|---|---|---|
|  | A | B | C | D |
| Diglycidyl ether ("Epon" 1004) | 200 | 200 | 200 | 200 |
| Adduct No. 1 | 29 | 36 | 43 | 60 |
| 2-methyl imidazole catalyst | 2 | 2 | 2 | 2 |
| Wetting agent | 1 | 1 | 1 | 1 |
| Epoxy diluent | 1 | 1 | 1 | 2 |
| Gel time at 205° C. (sec.) | 14 | 12 | 11 | 12 |
| Tensile strength (p.s.i.) | 7070 | 7600 | 7650 | 7900 |
| Elongation at break (percent) | 15 | 24 | 16 | 16 |
| 180° bend test (10 mils) | Pass | Pass | Pass | Pass |

The ratio of the carboxyl equivalent of Adduct No. 1 to the epoxide equivalent of the diglycidyl ether for Compositions A, B, C and D were 0.8, 1.0, 1.2 and 1.4, respectively.

A powder identical to Composition B of this example, except that it was made on a production scale using a 60-inch (150-cm.) rubber mill and included the pigment mixture of Example 1, was tested as follows:

Steel pipe of 1¼-inch (3.2-cm.) inside diameter and ⅜-inch (0.95-cm.) wall thickness was preheated to 232° C. and dry sprayed with the production powder. Twenty seconds later, the coated pipe was quenched in water at 10° C. The coated pipe at ordinary room temperature was bent 90 degrees at a radious of 7½ inches (1–9 cm.) without cracking the cured coating which had a thickness of about 10 mils (0.25 mm.).

Another portion of the same powder was dry sprayed on a sandblasted steel panel of ½-inch (1.3-cm.) thickness, and the coated panel was suspended in an air-circulating oven at 205° C. for 10 minutes to provide a cured protective coating about 0.25 mm. in thickness. After cooling to room temperature, a hole of 3.2 mm. diameter was drilled at the center of the coated panel to a depth of about 1.6 mm. A metal cylinder was adhered to the panel to form a water-tight, electrical-insulating seal with the drilled hole at the center. The cylinder was then filled with water containing 1% sodium sulfate, 1% sodium chloride and 1% sodium carbonate. A 1½ volt direct current was passed through the solution with the positive connected to the metal cylinder and the negative connected to the steel panel. After 30 days, the resin coating had disbonded to a maximum diameter of about 2.0 cm. at the hole. This test shows that the cured coating was well bonded to the steel and was satisfactorily resistant to disbondment in an adverse environment.

Other catalysts

A number of powders were prepared on a laboratory basis as in Example 3, Composition B, except using various catalysts as indicated below along with test results, where determined, as in Example 1:

| Composition | Catalyst | Parts per 100 parts resin | Gel time (sec.) | Tensile strength (p.s.i.) | Elongation at break, percent |
|---|---|---|---|---|---|
| E | 2-methyl imidazole | 0.25 | 19 | 7,600 | 17 |
| F | do | 0.50 | 15 | 7,700 | 14 |
| G | do | 1.00 | 11 | 7,700 | 18 |
| H | do | 1.50 | 9 | 7,300 | 18 |
| I | do | 2.0 | 7 | 8,350 | 15 |
| J | Triethylene diamine ("Dabco") | 0.8 | 20 | 6,600 | 8 |
| K | Stannous octoate | 0.8 | 45 | 7,430 | 14 |
| L | Triphenylphosphine | 0.8 | 18 | 7,660 | 11 |
| M | Melamine | 1.0 | 31 | 7,800 | 14 |
| N | Hexamethylenetetramine | 0.9 | 20 |  |  |

Cured strips of Compositions E–M of 10-mil thickness were subjected to the 180° Bend Test, and all passed without cracking.

In addition to uses illustrated in the foregoing examples, compositions of the present invention may also be used as molding compounds, particularly for the encapsulation of electrical components. For such uses, it may be desirable to employ surface-acting release agents and large amounts of fillers, even though fillers tend to reduce the flexibility of cured product.

We claim:
1. A shelf-stable epoxy resin composition that can be pulverized at room temperature to provide a dry powder which will pass 100-mesh screen and which initially and temporarily thermosoftens and subsequently gels in less than 2 minutes at 205° C. to provide a tough, flexible, chemically resistant cured product, said composition comprising a homogeneous blend of
   a diglycidyl ether of bisphenol A having a melting point above 70° C., and
   an adduct of one mole of trimellitic anhydride per hydroxyl equivalent of polyethylene or polypropylene glycol having more than 15 and up to 30 carbon and oxygen atoms in the skeletal chain between the hydroxyl groups, said adduct being present in an amount providing ⅔ to 1½ carboxyl equivalents per epoxide equivalent of diglycidyl ether.

2. Epoxy resin composition as defined in claim 1 and including a catalyst for accelerating epoxy-carboxyl interaction in a catalytic amount sufficient to cause the composition to gel within 45 seconds at 205° C.

3. A dry shelf-stable powder which will pass 100-mesh screen and which will fuse and adhere to moderately preheated objects to coat the objects with a tough flexible, chemically resistant cured coating, said powder comprising particles, each of which is a homogeneous blend of
   a diglycidyl ether of bisphenol A having a melting point above 70° C.,
   an adduct of two mols of trimellitic anhydride and one mole of polyethylene or polypropylene glycol having at least 15 and up to about 30 or 40 carbon and oxygen atoms in the skeletal chain between the terminal hydroxyl groups, said adduct being present in an amount providing 0.8 to 1.4 carboxyl equivalents per epoxy equivalent of diglycidyl ether, and
   a catalyst which accelerates epoxy-carboxyl interaction in a catalytic amount sufficient to cause the composition to gel within 45 seconds after fusing to an object preheated to 205° C.

4. Method of making a thermosetting composition including the steps of inter-reacting two mols of trimellitic anhydride and one mol of a polyethylene or polypropylene glycol to provide an adduct and mixing the adduct with a diglycidyl ether of bisphenol A having a melting point of at least 70° C., characterized by the fact that the polyglycol has more than 15 and up to about 30 or 40 carbon and oxygen atoms in the skeletal chain between the hydroxyl groups and the adduct and diglycidyl ether are fused together to provide a homogeneous blend which can be pulverized into fine free-flowing powder.

References Cited

UNITED STATES PATENTS 3,336,251  8/1967  Manasia _____ 260—78.4 X

OTHER REFERENCES

Chemical Abstract (C.A.), vol. 64, May 1966, p. 14423a.

WILLIAM H. SHORT, Primary Examiner
T. E. PERTILLA, Assistant Examiner

U.S. Cl. X.R.

117—127 R, 128.4 R, 161 ZB